(12) United States Patent
Guj et al.

(10) Patent No.: US 12,172,349 B2
(45) Date of Patent: Dec. 24, 2024

(54) FLEXIBLE FILM FLUID-DISPENSING DEVICE

(71) Applicant: Dow Global Technologies LLC, Midland, MI (US)

(72) Inventors: Luca Guj, Horgen (CH); Colmar Wocke, Horgen (CH); Mirella Coroneo, Correggio (IT); Vanni Parenti, Campagnola (IT)

(73) Assignee: Dow Global Technologies LLC, Midland, MI (US)

( * ) Notice: Subject to any disclaimer, the term of this patent is extended or adjusted under 35 U.S.C. 154(b) by 222 days.

(21) Appl. No.: 17/597,531

(22) PCT Filed: Sep. 1, 2020

(86) PCT No.: PCT/US2020/048887
§ 371 (c)(1),
(2) Date: Jan. 10, 2022

(87) PCT Pub. No.: WO2021/046020
PCT Pub. Date: Mar. 11, 2021

(65) Prior Publication Data
US 2022/0250291 A1    Aug. 11, 2022

(30) Foreign Application Priority Data
Sep. 6, 2019 (IT) .................... 102019000015725

(51) Int. Cl.
*B29C 44/34* (2006.01)
*B29C 44/46* (2006.01)
(Continued)

(52) U.S. Cl.
CPC .......... *B29C 44/505* (2016.11); *B29C 44/461* (2013.01); *B29C 66/45* (2013.01);
(Continued)

(58) Field of Classification Search
CPC ........... B05B 1/04; B05B 1/14; B29C 44/505; B29C 44/461; B29C 48/08; B29C 48/07; B29C 48/305
(Continued)

(56) References Cited

U.S. PATENT DOCUMENTS 4,017,240 A * 4/1977 Nelson ................. B29C 48/70
                                                    137/561 A
5,753,155 A * 5/1998 Hanusa .............. B29C 33/0061
                                                    264/328.12
(Continued)

FOREIGN PATENT DOCUMENTS

CN    106626216    5/2017
GB    1279007      6/1972
(Continued)

*Primary Examiner* — Charles P. Cheyney

(57) ABSTRACT

A flexible film fluid-dispensing device including (A) at least one flexible film liner member having a flexibility property of from 3.6e-10 Nm to 2 Nm; (B) a rigid frame member for receiving the flexible film liner member and for removably holding the flexible film liner member in place during the flow of fluid through the flexible fluid-dispensing device; and (C) a connection means for connecting the flexible film fluid-dispensing device to the outlet feed stream of a fluid production process line; a process of manufacturing the above flexible film fluid-dispensing device; and a process for dispensing a fluid using the above flexible film fluid-dispensing device.

11 Claims, 11 Drawing Sheets

(51) Int. Cl.
    *B29C 44/50*     (2006.01)
    *B29C 65/00*     (2006.01)
    *B29L 7/00*     (2006.01)
    *B29L 9/00*     (2006.01)
    *B29L 22/00*     (2006.01)

(52) U.S. Cl.
    CPC ....... *B29L 2007/00* (2013.01); *B29L 2009/00* (2013.01); *B29L 2022/00* (2013.01)

(58) Field of Classification Search
    USPC ...... 222/105, 107, 478; 425/461; 137/561 A
    See application file for complete search history.

(56) References Cited

U.S. PATENT DOCUMENTS

| | | | |
|---|---|---|---|
| 5,992,453 A * | 11/1999 | Zimmer | B05C 11/10 |
| | | | 137/561 A |
| 6,383,425 B1 * | 5/2002 | Wu | B29C 44/505 |
| | | | 264/53 |
| 6,431,695 B1 | 8/2002 | Johnston et al. | |
| 7,040,555 B2 | 5/2006 | Miinalainen et al. | |
| 7,575,635 B2 | 8/2009 | Perttila et al. | |
| 9,643,358 B2 * | 5/2017 | Lewis | B29C 64/188 |
| 9,718,223 B2 | 8/2017 | Koster | |
| 10,427,852 B2 | 10/2019 | Franca et al. | |
| 11,426,740 B2 * | 8/2022 | Giannazzo | B05B 1/04 |
| 2003/0075623 A1 * | 4/2003 | Bartels | F15C 1/22 |
| | | | 239/596 |
| 2004/0195392 A1 * | 10/2004 | Miinalainen | B05C 5/0275 |
| | | | 239/565 |
| 2007/0267443 A1 | 11/2007 | Rub et al. | |
| 2009/0098237 A1 * | 4/2009 | Itadani | B29C 48/345 |
| | | | 425/464 |
| 2010/0080900 A1 | 4/2010 | Geraedts et al. | |
| 2013/0319575 A1 * | 12/2013 | Mendyk | A61J 1/1475 |
| | | | 141/94 |
| 2014/0017412 A1 | 1/2014 | Schoen et al. | |
| 2016/0002428 A1 | 1/2016 | Kuroda et al. | |
| 2017/0247156 A1 | 8/2017 | Chopin, III et al. | |
| 2017/0285619 A1 | 10/2017 | Brennan | |
| 2018/0194504 A1 * | 7/2018 | Franca | B05B 11/047 |

FOREIGN PATENT DOCUMENTS

| | | |
|---|---|---|
| JP | 5154932 | 6/1993 |
| JP | 2006142125 | 6/2006 |
| JP | 05378680 | 12/2013 |
| WO | 2017121894 | 7/2017 |

* cited by examiner

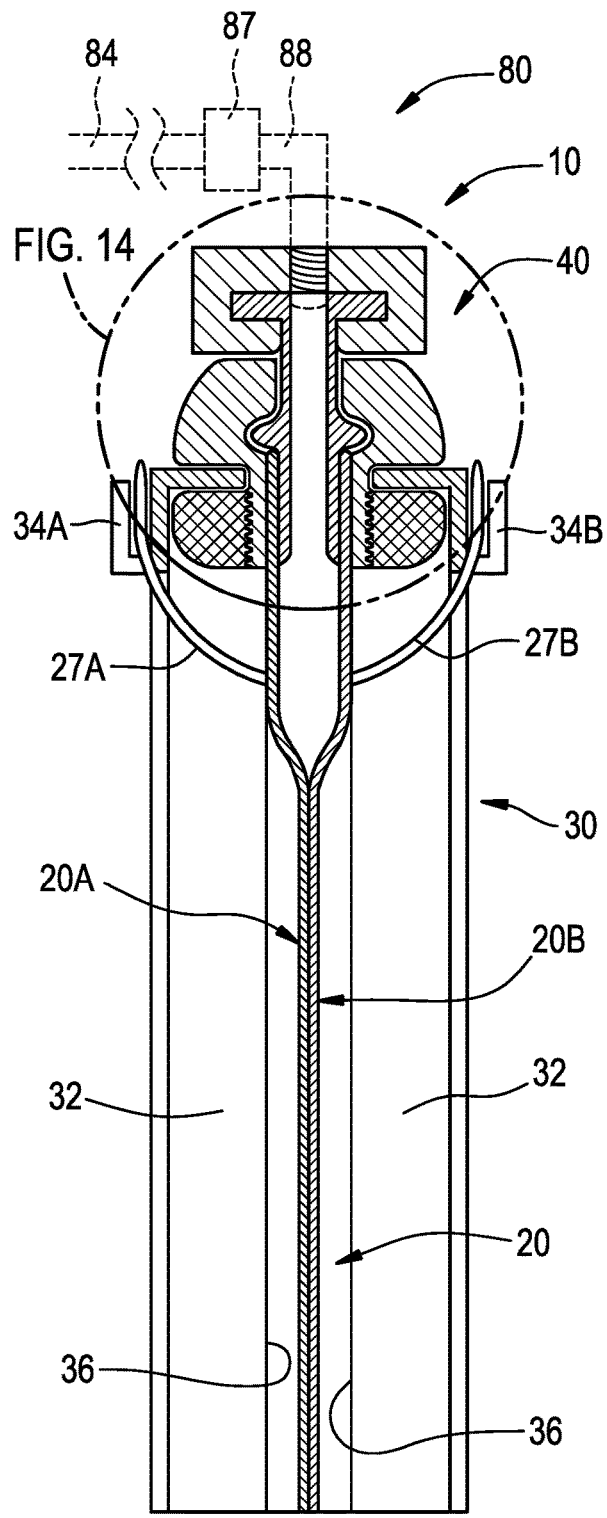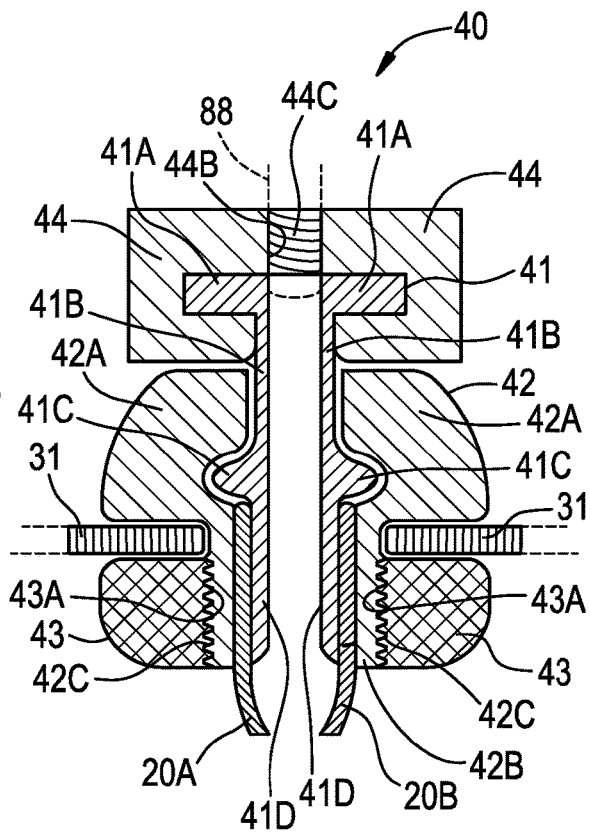

US 12,172,349 B2

FLEXIBLE FILM FLUID-DISPENSING DEVICE

FIELD

The present invention relates to a dispensing device for dispensing a fluid; and more specifically, the present invention relates to a flexible film fluid-dispensing device for dispensing a reactive mixture foam-forming fluid useful in a process for producing a foam sandwich panel member.

BACKGROUND

Polymeric foams, in particular polyurethane foams, are well known. In general, the preparation of a polyurethane foam requires the mixing of reactive chemical components, such as a polyol and an isocyanate, in the presence of normally used additives such as a suitable catalyst, a surfactant or cell growth control agent, and a physical and/or chemical blowing agent which permits the blowing of the foam.

In a continuous process for producing a rigid foam, and particularly in the production of rigid foams for manufacturing a foam panel structure, as currently practiced on conventional machines, it is common practice to spread or pour, via a dispenser or dispensing device, a thin layer of a reactive mixture of the foam-forming components, in a liquid state, inbetween a bottom (or lower) sheet substrate (one outer layer) and a top (or upper) sheet substrate (another outer layer) while the sheet substrates are moving for example in a lateral direction (i.e. in a horizontal direction).

Then, as the reactive mixture moves laterally with the bottom sheet substrate, the foam is allowed to start to rise freely, due to the reaction between the chemical components and the effects of the blowing agent, until the expansion of the foam reaches and contacts the top sheet substrate; and the foam forms a panel structure integrally attached to the top sheet substrate and the bottom sheet substrate. The foam in the panel structure is then allowed to cure; and thereafter, the panel structure is cross-sawn into panels. The foam composite panel structure typically includes, for example, a polyurethane resin (PUR) foam core or a polyisocyanurate resin (PIR) foam core. The foam core and outer layers of the panel often are also called sandwich elements or sandwich panels. A common process for the production of a composite panel structure composed of metallic outer layers with a core of foam, as generally described above, includes for example, a double band lamination (DBL) process. And, depending on the type of facing (e.g., steel facing) (one of the outer layers of the panel) on the panel, DBL can be distinguished in rigid-faced DBL (RF-DBL) and flexible-faced DBL (FF-DBL).

As aforementioned, the DBL process apparatus includes: (1) a lower moving sheet of a desired substrate; (2) an upper sheet of a desired substrate; and (3) a dispenser for applying a reactive foam-forming composition, which can be an emulsion, onto the lower moving sheet of the apparatus. And in general, the DBL process includes the steps of: (I) providing a reactive foam-forming composition by mixing: (a) the polyol mixture, containing polyols, catalysts, additives and gases, i.e. blowing and nucleation agents, with (b) isocyanate, to obtain a reactive emulsion wherein the reacting liquids in the emulsion ultimately react to form the final PUR foam or PIR foam inbetween the upper (top) and lower (bottom) sheet substrates; and (II) distributing the above obtained emulsion onto the lower moving sheet of the DBL process equipment via a dispenser (also referred to as the "lay down" step). As the emulsion is distributed on the lower sheet substrate, the gases (blowing and nucleating agents) nucleate and expand via bubbles leading to the formation of the final foam that fills the gap between the two sheets, which are confined inside the double band. For example, in a DBL process, a dispenser means, device, or apparatus is used to distribute the PUR or PIR emulsion mixture throughout the lower moving sheet width where the foam reacts and polymerizes between the lower and upper sheets. In a short time, the foam cures to form an integral multilayer (e.g., a three-layer) foamed panel structure. Then, the formed multilayer foamed structure is cut into blocks or sections (or "panels") of the desired length to form the panel products.

Using a RFDBL process requires that the dispenser or dispensing device used in the process satisfy a strict set of requirements including, for example: (1) a good quality of the top surface foam wherein the dispenser has to provide a uniform distribution of the foam-forming reactive mixture through the panel width leading to a good aesthetic quality of the top facing sheet substrate; (2) a good working dispenser with a long operational life to provide fewer stops of a continuous process. In general, a normal operational life requirement for the dispenser is half a production shift, i.e. approximately (~) 4 hours (hr). The operational life of the dispenser is mainly driven by fouling of the reactive mixture that partially or completely obstructs the flow within the dispenser ducts or passageways; (3) a good flexibility wherein the dispenser can serve a broad range of emulsion viscosities and flow rates; and (4) a lower dispenser cost since the dispenser article is an additional cost and such cost needs to be kept low given the fact that these devices are disposable and the current lifetime is around 4 hr.

Heretofore, a distribution rake produced by a conventional injection molding process has been used to make a foam product. Developments in the field of manufacturing a foam panel typically are directed only to the geometry of a dispensing device and not to technology directed to the fabrication of the dispensing device. In addition, the problem of dispenser lifetime is not addressed by the prior art. Instead, the focus of the prior art is achieving a good distribution or to decrease defects of the foam surface after the laydown step of the process. It is desired therefore to provide a flexible film dispensing device suitable for dispensing a reactive fluid composition such a foam-forming fluid reaction composition.

SUMMARY

The present invention is directed to a novel flexible film fluid-dispensing apparatus or device for use in a production line and process for manufacturing a rigid foam multilayer panel article (structure or member). The present invention flexible film fluid-dispensing device is suitable for dispensing a fluid and particularly a reactive fluid composition such as a polyurethane foam-forming fluid reaction composition. The construction of the flexible film fluid-dispensing device of the present invention can solve the problem of dispenser lifetime and other problems of known fluid dispensing devices of the prior art when the flexible film fluid-dispensing device of the present invention is used in a production line for producing a rigid foam multilayer or sandwich panel article.

The present invention flexible film fluid-dispensing device is also interchangeably referred to herein as a "flexible film dispenser" or a "flexible film distributor"; a "flexible film dispensing system" or a "flexible film distribution system"; a "flexible dispenser" or a "flexible distributor"; or simply a "dispenser" or a "distributor". Hereinafter, the flexible film fluid-dispensing device of the present invention will be referred to as a flexible film fluid-dispensing device and abbreviated as "FFDD".

In one general embodiment, the FFDD includes: (a) a flexible film fluid-dispensing liner member (also referred to herein as a "liner member" or simply a "liner"); (b) a rigid frame member (or "frame") for holding in place the liner during use thereof; and (c) a connection means (or "connector") for connecting an inlet of the FFDD to an outlet of a fluid manufacturing system for manufacturing components of the fluid and passing the fluid from the manufacturing system through the FFDD via the inlet of the FFDD and the plurality of outlets of the FFDD.

Another embodiment of the present invention includes a process for dispensing a fluid such as a reactive mixture fluid using the above FFDD.

Still another embodiment of the present invention includes a process for making the FFDD of the present invention.

One of the objectives of the present invention is to provide a novel FFDD design such that the design is technically superior in function to known prior art fluid dispensers. The superior industrial design of the FFDD of the present invention is capable of readily dispensing a reactive mixture fluid such as an emulsion for PIR/PUR panel production using, for example, a RFDBL continuous process.

BRIEF DESCRIPTION OF THE DRAWINGS

FIG. 13 is a cross-sectional view of a portion of the FFDD of FIG. 4 taken along line 13-13.

FIG. 14 is an enlarged view of a portion of the FFDD cross sectional view of FIG. 13 showing a connection assembly of the FFDD of FIG. 13.

DETAILED DESCRIPTION

Figure 1:
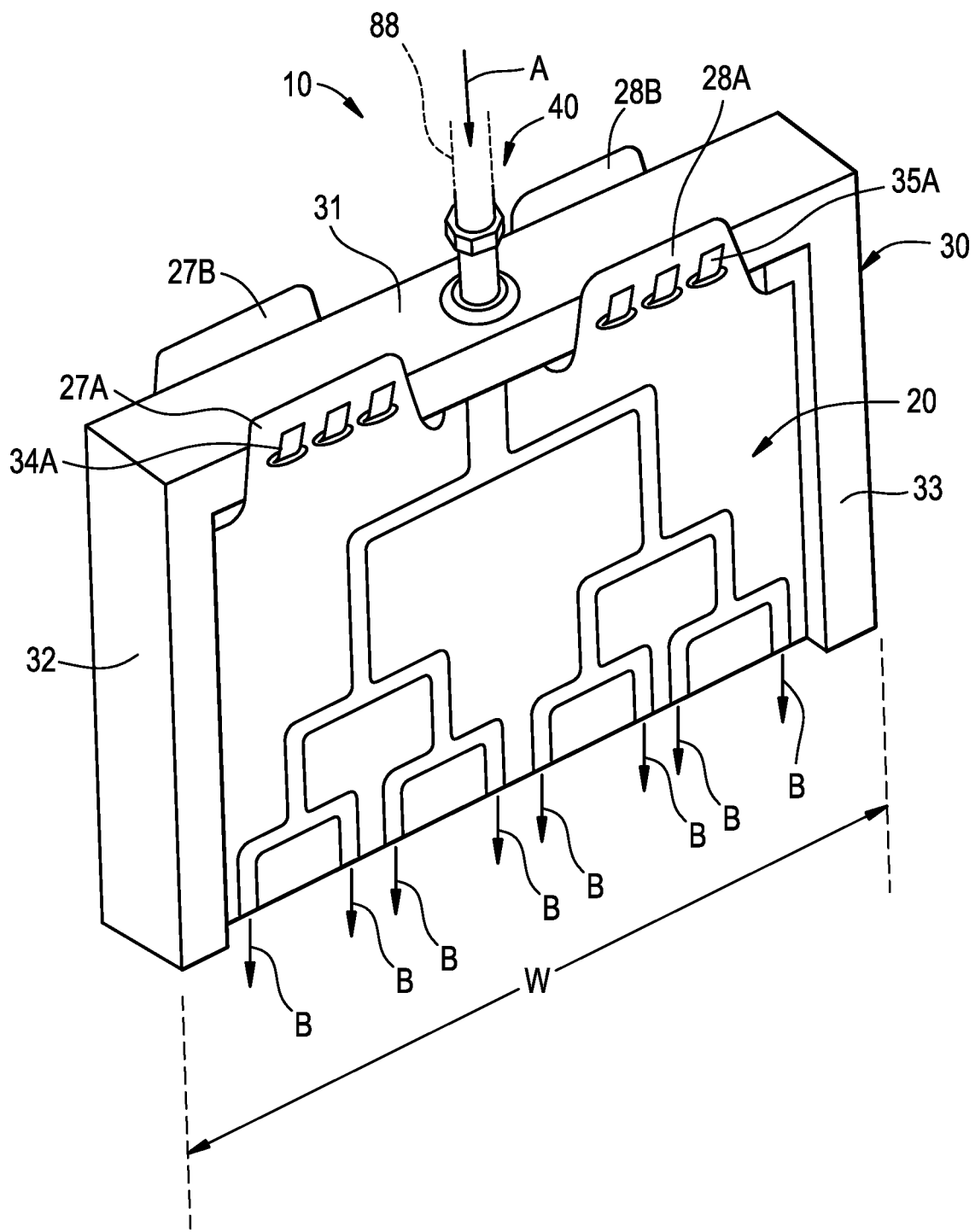
FIG. 1 is a perspective front view of a FFDD showing a flexible film fluid-dispensing liner member fastened to a frame member for holding the flexible film fluid-dispensing liner member in place.
Figure 2:
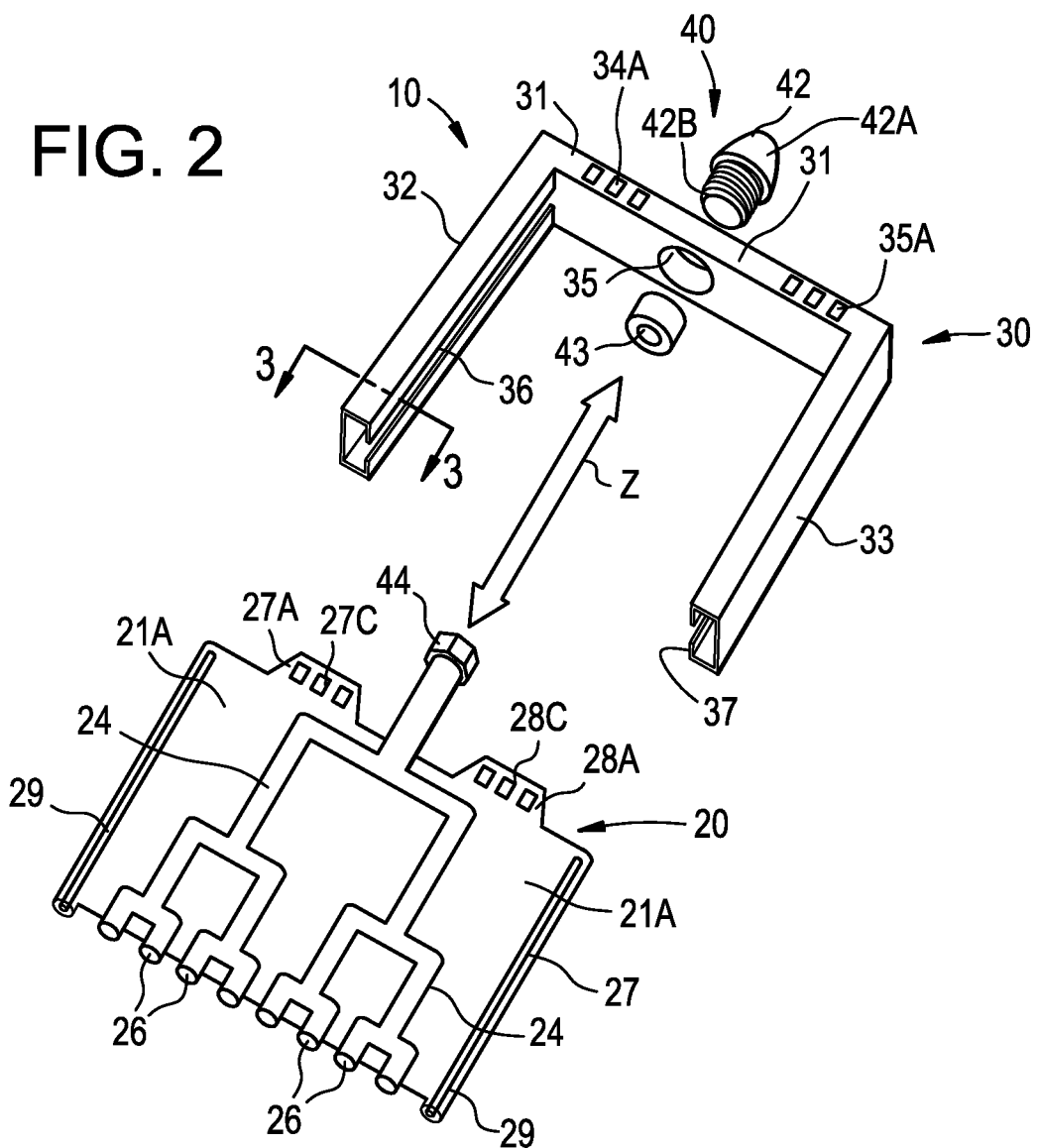
FIG. 2 is a perspective exploded view of the FFDD of FIG. 1.
Figure 3:
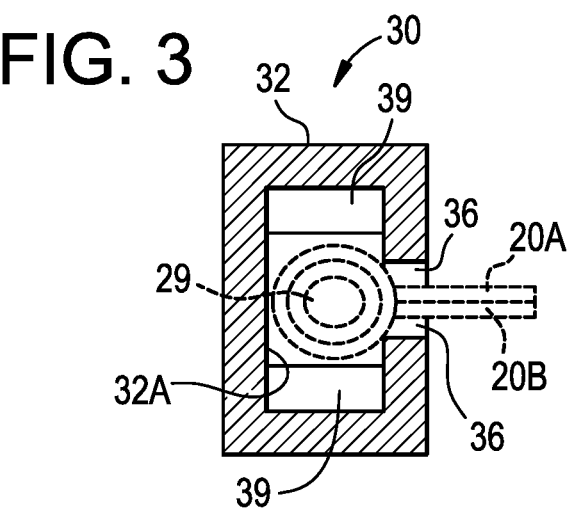
FIG. 3 is an enlarged cross-sectional view of a portion of the FFDD of FIG. 3 taken along line 3-3.

As used throughout this specification, the abbreviations given below have the following meanings, unless the context clearly indicates otherwise: "=" means "equals"; ">" means "greater than"; "<" means "less than"; μm=micron(s), nm=nanometer(s), g=gram(s); mg=milligram(s); L=liter(s); mL=milliliter(s); ppm=parts per million; m=meter(s); mm=millimeter(s); °=degrees; cm=centimeter(s); min=minute(s); m/min=meters(s) per minute; s=second(s); Nm=Newtons-meters; hr=hour(s); ° C.=degree(s) Celsius; ms=milliseconds %=percent, vol %=volume percent; and wt %=weight percent.

In one broad embodiment, the FFDD of the present invention includes: (a) a flexible film fluid-dispensing liner member, also referred to herein interchangeably as a "flexible film liner", a "flexible liner", or simply a "liner"; (b) a rigid frame member for holding in place the flexible film fluid-dispensing liner member during use thereof; and (c) a connection means for connecting an inlet of the FFDD to an outlet means of a fluid production system for passing fluid from the fluid production system through the FFDD via the inlet of the FFDD and the plurality of outlets of the FFDD.

With reference to FIGS. 1-14, there is shown one embodiment of the FFDD of the present invention, generally indicated by reference numeral 10. The FFDD 10 includes, for example: (a) a flexible film fluid-dispensing liner member, generally indicated by reference numeral 20; (b) a rigid frame member, generally indicated by reference numeral 30 useful for holding the liner 20 in place; and (c) a connection means, generally indicated by reference numeral 40, for connecting the FFDD, via the inlet of the liner 20 and frame 30, to an outlet means 88 (e.g., a pipe shown in dotted lines in FIGS. 13 and 14) of a mixing unit 87 (shown in FIGS. 13 and 15), which in turn, is connected via pipe 84-86 (shown in FIG. 15) to a manufacturing system that produces a fluid that can be dispensed using the FFDD of the present invention. The fluid from a fluid manufacturing plant (stored in vessels 81-83): (1) enters one or more inlet(s) of the mixing unit or head 87, (2) exits the mixing head 87 and enters the inlet(s) 25 of the FFDD via pipe 88 in a direction such as indicated by directional arrow A, (3) passes through the FFDD 10 via ducts 24, and (4) exits the FFDD 10 from two or more outlet(s) 26 of the FFDD. The fluid exits the FFDD from outlets 26 in a direction such as indicated by directional arrow B.

With reference to FIGS. 1-14 again, the FFDD 10 includes the liner 20, for example, a flexible film liner made of multiple film layers wherein at least one layer of the liner is made of heat-sealing material to be heat sealed by a heat-sealing process wherein the heat sealing process produces a flow path in the form of a series of ducts or passageways 24 for fluid to be dispensed from the FFDD 10.

The ducts 24 are embedded internally in the liner 20. Typically, the flow passages 24 are defined by the negative impression of a sealing die when forming the liner 20 using a heat-sealing process. The rigid frame 30 of the FFDD 10 functions to hold the liner 20 in place during usage of the FFDD 10. The connection means or connector 40, which in a preferred embodiment is a hermetically sealed junction/s, is used for connecting the FFDD 10 to the outlet means of a fluid manufacturing production line. In one embodiment, the FFDD 10 is attached to a manufacturing line via the hermetic connector 40 to allow a foam-forming fluid to be: (1) fed into the FFDD 10, passed through the FFDD 10, and (3) dispensed onto the surface of a moving or stationary bottom sheet, particularly a moving bottom sheet substrate 95 of the foam-forming section 90 of a production line 70 (shown in FIG. 15) useful in the present invention.

In a preferred embodiment, the liner 20 of the FFDD 10 which is held in place by the rigid frame 30, includes at least two areas, (i) a heat-sealed area, and (ii) a flow path area in the form of a pattern of a series of inflatable ducts 24 for allowing a fluid or emulsion (e.g., a fluid reactive mixture) to flow therethrough.

The flexible film fluid-dispensing liner member 20 useful for making the FFDD 10 of the present invention can be, for example, a liner described in Italian Patent Application Serial No. 102019000015716, filed on Sep. 6, 2019 by Dow Global Technologies LLC.

Figure 6:
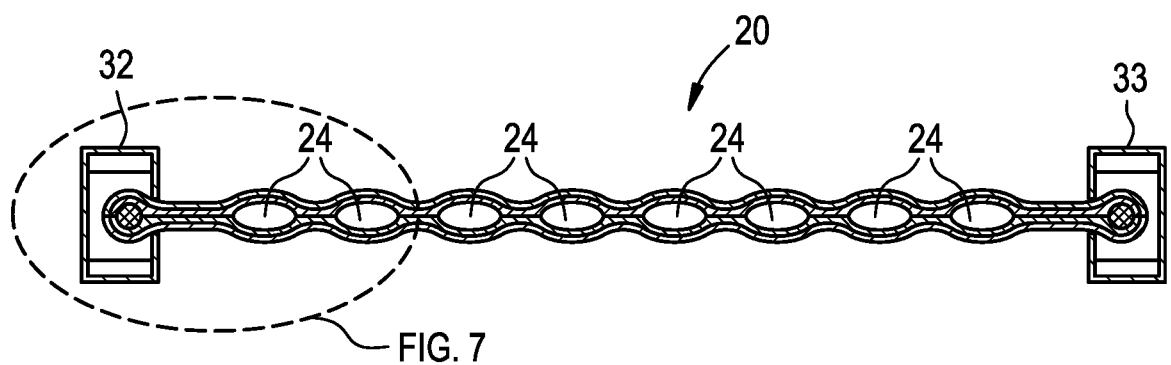
FIG. 6 is a cross-sectional view of the FFDD of FIG. 4 taken along line 6-6.
Figure 7:
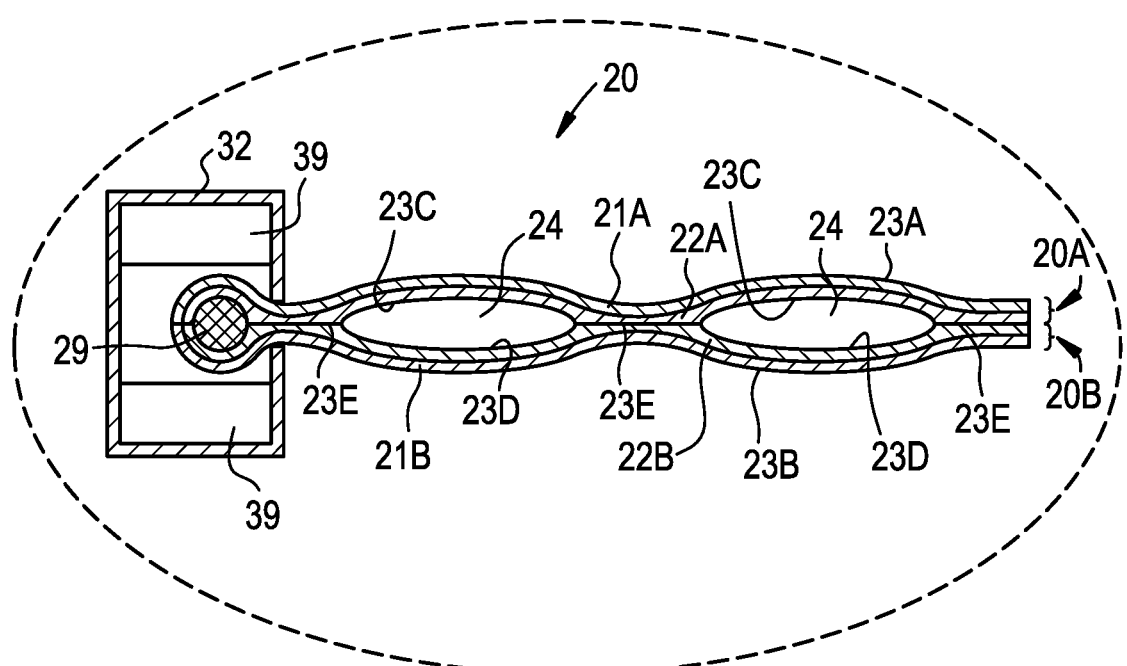
FIG. 7 is an enlarged view of a portion of the FFDD cross-sectional view of FIG. 6 showing the ducts in the liner of the FFDD deflated when the FFDD is not in use with liquid fluid flowing inside the ducts.

In general, the liner 20, as shown in FIGS. 6 and 7, is a flexible multilayer film fluid-dispensing liner member that includes at least one first flexible multilayer film substrate, generally indicated by reference numeral 20A, bonded to at least one second flexible multilayer film substrate, generally indicated by reference numeral 20B. Although not shown, in one broad embodiment, the flexible film substrate 20A and the flexible film substrate 20B each separately and individually can be a single layer; or the flexible film substrate 20A and the flexible film substrate 20B each separately and individually can be a multilayer structure (e.g. a layered structure having two or more layers). A two-layer structure of the substrates 20A and 20B are shown in FIGS. 6 and 7.

For example, the flexible film substrate 20A includes at least a first flexible film outer layer 21A; and at least a second flexible film inner layer 22A; and the film substrate 20B includes at least a first flexible film outer layer 21B; and at least a second flexible film inner layer 22B. The first flexible film outer layer 21A is bonded to the second flexible film inner layer 22A to form film substrate 20A. Similarly, the second flexible film outer layer 21B is bonded to the second flexible film inner layer 22B to form film substrate 20B.

In one embodiment, the overall flexible film liner 20 is formed, for example, by contacting the inner surface 23C of the inner layer 22A of film substrate 20A to the inner surface 23D of the inner layer 22B of film substrate 20B; and bonding the two substrate 20A and 20B to each other via the inner layers 22A and 22B to form the flexible multilayer film fluid-dispensing liner member 20. In one embodiment, the film substrates 20A and 20B of the flexible multilayer film fluid-dispensing member 20 can be bonded, for example, by heat sealing, the inner layers 22A and 22B to form the flexible multilayer film fluid-dispensing liner member 20 as shown in FIGS. 6 and 7.

As aforementioned, the two substrates 20A and 20B forming the flexible multilayer film fluid-dispensing liner member 20 can be made using one layer or multiple layers such as film substrates 20A and 20B shown in FIGS. 6 and 7. For example, in one embodiment (not shown); a single film structure such as 20A, because of its flexibility, can be folded in half such that the inner layer 22A of each folded half contact each other; and then the two halves can be bonded to each other by heat sealing to form the flexible multilayer film fluid-dispensing liner member 20.

The unique flexible film construction of the flexible multilayer film fluid-dispensing liner member 20 used in the present invention allows the use of both laminated films and coextruded films. Therefore, each layer of the multilayer flexible film liner can be tailored for a specific need such as a degree of stiffness or a low chemical affinity to a fluid to be dispensed such as a fluid mixture of reactive components, for example, components of a polyurethane-based fluid.

The materials useful for manufacturing the outer and inner layers 21A, 21B, 22A, and 22B of the flexible film fluid-dispensing liner member 20 include, for example: polyethylene (PE), polyethylene terephthalate (PET), oriented polyethylene terephthalate (OPET), metalized polyethylene terephthalate (mPET), polypropylene (PP), oriented polypropylene (OPP), biaxially oriented polypropylene (BOPP), oriented polyamide (OPA)/Nylon, silicones or a coextruded (COEX) film structure encompassing one or more of the aforementioned film layers. In a preferred embodiment, the film structure 20A and 20B each can be, for example, a two-layer film structure comprising, for example, (a) a first PET outer layer 21A, 21B for film structure 20A, 20B and (b) a second PE inner layer 22A, 22B for film structure 20A, 20B.

In FIGS. 1-9, there is shown one embodiment of the multilayer flexible film fluid-dispensing liner member 20 of the FFDD 10 including two film substrates 20A and 20B each substrate having a two-layer structure including an external or outer layer 21A and an internal or inner layer 22A for substrate 20A; and an external or outer layer 21B and an internal or inner layer 22B for substrate 20B. The outer layers 21A and 21B of the multilayer flexible film fluid-dispensing liner member 20 provide structural stiffness and integrity to the liner 20 while the inner layers 22A and 22B of the liner 20 exhibit a low chemical affinity with a fluid such as a reactive polyurethane-based fluid mixture. The advantages of having a low chemical affinity with the reactive polyurethane-based fluid mixture being dispensed include, for example: (1) fouling by the reactive polyurethane-based fluid mixture flowing through the ducts of the liner 20 is reduced; and (2) the working life of the liner 20 is prolonged, which in turn, prolongs the life of the FFDD 10.

Each layer of the liner 20 can be of any desired length, height and thickness. Generally, each of the layers of the film substrates 20A and 20B can have a thickness in the range of, for example, from 20 µm to 2 mm in one general embodiment; from 50 µm to 1 mm in another embodiment; and from 60 µm to 500 µm in still another embodiment.

The liner 20 made of flexible film substrates 20A and 20B should have dimensions sufficient to cover the width of a panel member 120 (see FIGS. 16 and 17) manufactured by a continuous production line and process 70 (see FIG. 15) such as a RFDBL process. Therefore, the width of the liner 20 includes, for example, a width of from 200 mm to 2,000 mm in one embodiment, from 800 mm to 1,350 mm in another embodiment; and from 900 mm to 1,150 mm in still another embodiment.

Figure 15:
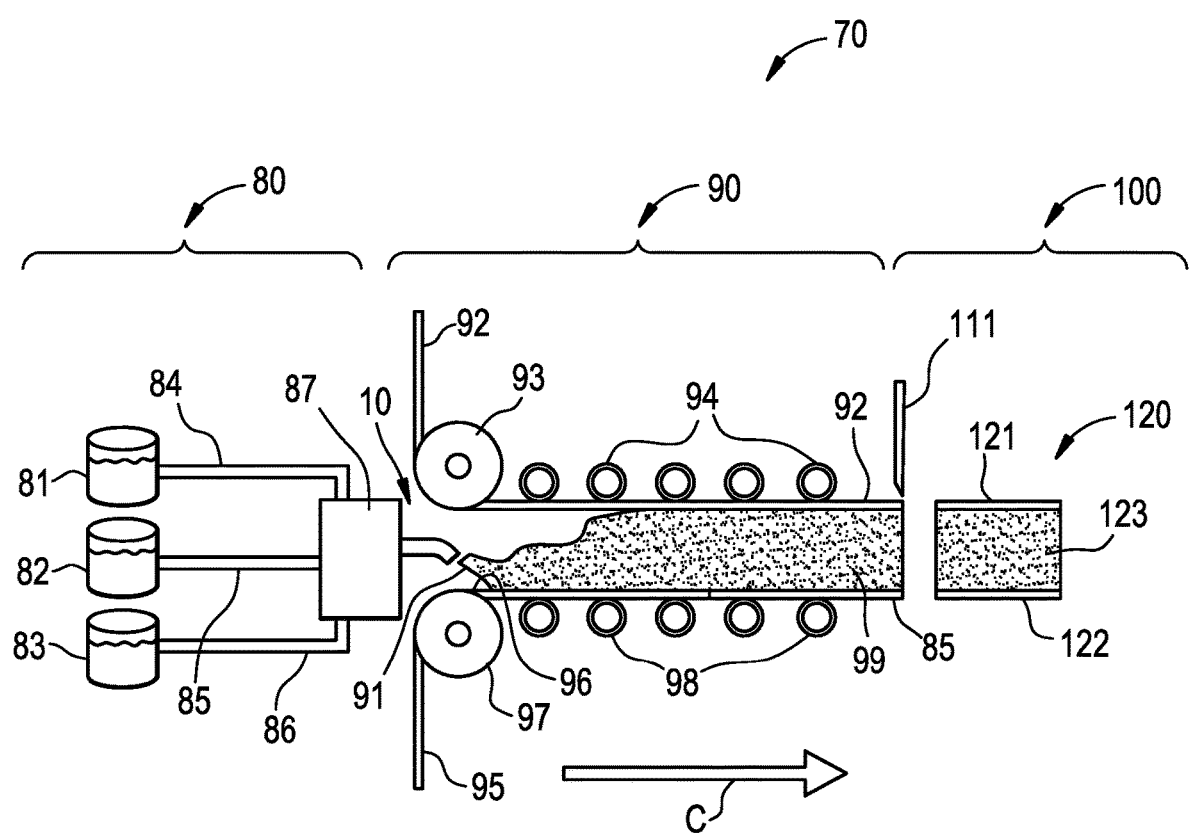
FIG. 15 is a schematic side view of a continuous process flow and production line (e.g., a rigid faced double belt lamination (RFDBL) process) showing several pieces of equipment for manufacturing a multilayer rigid foam sandwich panel member or article.

In one embodiment, a flow path of a fluid 91 being dispensed from the FFDD 10 includes the clearance distance between the distribution exit apertures 26 of the FFDD and the moving lower or bottom substrate 95 (e.g., a metal sheet) of the RFDBL process (shown in FIG. 15). The angle between the FFDD 10 and the moving bottom substrate 95 can be between vertical installation. i.e. α=90 degrees (°) and horizontal installation, i.e. α=0°. Therefore, the height of the FFDD includes, for example, a height of from 15 mm to 400 mm in one embodiment, from 50 mm to 300 mm in another embodiment; and from 100 to 200 in still another embodiment.

When the flow of the reacting fluid starts, the flow ducts inflate automatically and allow the fluid to go through the non-sealed area of the FFDD and ultimately exiting the ducts and exiting the FFDD onto a lower moving metal lamination sheet that receives the fluid and allows the fluid to foam until contacting the upper moving metal lamination sheet.

In constructing the FFDD of the present invention, the flow path of the fluid being dispensed and flowing through the ducts 24 can be constructed and designed as appropriate for an application. For example, the flow path for the fluid in the FFDD is defined by the negative of the impression of the heat-sealing mold. This FFDD production technique allows to easily and inexpensively define complex and efficient fluid flow paths otherwise impossible with standard construction methods and conventional apparatuses such as rigid injection-molded dispensers or multi-branching pipe dispensers. The production process for the liner 20 also allows to easily change the fluid flow path geometry to adapt to different fluid or emulsion viscosities and/or flow rates. The fluid flow path can also be modified to have one inlet or multiple inlets according to the requirements of a particular production line.

The flexible nature of liner 20 and the flow ducts 24 prolong the working life of the FFDD by reducing fouling. In fact, when a duct obstruction occurs, the increased local pressure will deform the flexible walls of the liner 20 ensuring the flow of the fluid such as a polyurethane-based or polyisocyanurate-based reactive fluid mixture. This phenomenon in conjunction with the low polyurethane-surface chemical affinity may also lead to the expulsion of the formed obstruction. The aforementioned phenomenon results in a relevant prolongation of the FFDD working life. In one general embodiment, the useful working life of a FFDL of the present invention and the dispenser lifetime including the FFDL is >4 hr in one embodiment; >8 hr in another embodiment; and >16 hr. In other embodiment, the FFDL of the present invention can last as much as up to 24 hr or more.

One process of fabricating the liner 20 containing ducts includes, for example, a heat-sealing process wherein the ducts creating a flow path for the fluid to be dispensed is defined by the negative impression of a sealing die.

The liner 20 includes, for example, at least two areas, (i) a solid area wherein a fluid cannot flow therethrough and (ii) an area defining a flow path for fluid to pass through the flexible liner. For example, the flow path of the fluid can be in the form of a pattern or a series of inflatable ducts for fluid such as an emulsion to flow therethrough.

In a preferred embodiment, the substrates 20A and 20B useful for the liner 20 described above are made of heat sealable material to provide heat-sealed areas and flexible areas for forming the pathways for the FFDD.

In one embodiment, for example, the sealing process (temperature and pressure) need to be such that the seal integrity and seal strength allows for the liner 20 to withstands the pressure induced by the fluid flow. Moreover, the sealing process (e.g. pressure and temperature) needs to be such that the structural performance of the material layers close to the sealing area are not deteriorated by the pressure induced by the fluid flow.

The ducts or channels 26 can be formed by pressing and heat welding polymeric sheets together and applying heating for enough time to cause a weld of the two substrates 20A and 20B; and in so-doing form the desired channels for the PU to flow in. The heat sealable inner layers 22A and 22B of substrates 20A and 20B, respectively, may generally be laminates of, for example, DOWLEX LLDPE 5056, DOWLEX LLDPE 5400, (available from The Dow Chemical Company) with an outer film layers 21A and 21B on the outside of substrates 20A and 20B, respectively, such as PET. The liner 20 construction above would have some stiffness however in another embodiment, using an LLDPE film can provide more flexibility to the liner 20.

The process for producing the liner 20 can be carried by known techniques in the art, for example, a conventional process for making "PacXpert" bags as described in U.S. Patent Application Publication No. 2017/0247156 A1 published Aug. 31, 2017. In the process described in the above patent application, two layers of a laminate are brought together and bonded in the manner described in a specially designed rig or machine.

The process of making the liner 20 using, for example, a laminate of 150 microns thick, include the following conditions: a sealing pressure of from 3 bar to 5 bar; and a temperature range of heating shoe between 140° C. and 170° C. for the laminate. In another embodiment, for a monolayer of LLDPE (5056, 5400 or Elite) the temperature is about 130° C.; and a time of application is in the range of 500 ms to 1,000 ms (1 sec).

The LLDPE layer (e.g., DOWLEX LLDPE 5056, DOWLEX LLDPE 5400 or DOW ELITE) used as the inner layer has a natural dis-affinity for PU (the PET used as the outer layer has an affinity for the PU). This desirable affinity property is advantageous because by having a low affinity property the fouling of the ducts of the FFDD is reduced, which is a stated advantage of the design. The same LLDPE layer(s) are easy to heat bond through the application of heat and pressure as described above.

Different film structures can be conceived for the liner 20, encompassing, for example, PE layers; PE and PET layers; PE; and PET and OPA layers. In general, the liner 20 includes, for example, a sealing bar temperature of between 100° C. and 200° C., a sealing bar pressure of between 0.1 bar and 9 bar, and a residence time between 0.15 s and 2 s.

The liner 20 of the FFDD 10 can be made using alternative embodiments, for example, in one embodiment, an adhesive layer can be used to provide the bonding areas and flexible areas for forming the pathways/ducts 24 of the liner 20 for the FFDD 10. In another embodiment, a tie layer can be used to provide the bonding areas and flexible areas for forming the pathways/ducts 24 of the liner 20 for the FFDD 10. And, in still another embodiment, a combination of an adhesive layer and a tie layer can be used to provide the bonding areas and flexible areas for forming the pathways/ducts 24 of the liner 20 for the FFDD 10.

In a general embodiment, the liner 20 of the FFDD 10 has several advantageous properties including, for example, the liner 20: (1) can be made of one layer or multiple layers; (2) is constructed of a durable (or strong) material; (3) is made of heat-sealable material; (4) has dimensions such as to cover a panel width; (5) has a flow path that comprises the clearance between the distribution means of the FFDD and the moving bottom sheet substrate on which a fluid from the FFDD has been dispensed thereon; and (6) the film structure can be laminated or coextruded. In other embodiments, the liner 20 of the FFDD 10 includes other advantages, for example: (7) a material with a low affinity to the fluid being dispensed such as a polyurethane composition fluid can be used to make the liner 20, which is a material that could not be previously used with known injection molding technology; (8) the use of a low affinity to polyurethane material can advantageously increase the dispenser's lifetime; (9) a dispenser geometry that could not be previously produced, for cost or complexity reasons, can be used to design and produce the FFDD of the present invention; (10) fouling of the ducts of the liner 20 can be reduced by the deformation of the flexible ducts, particularly when the local pressure applied to the ducts is increased; and (11) the storage space needed at a production site can be reduced before and after use of the FFDD 10.

In another embodiment, the liner 20 of the FFDD 10 also has the advantageous property of being made of a flexible film structure. For example, the flexibility D of the FFDL is from 3.5e-10 Nm to 4 Nm in one embodiment, from 4.5e-9 to 2 Nm in another embodiment, and from 5e-5 Nm to 1 Nm in still another embodiment. The flexibility property of the FFDL is measured, for example, by the following Equation (I):

$$D = \frac{Et^3}{12(1-v^2)} \qquad \text{Equation (I)}$$

where t is the thickness, E is the Young modulus and v is the Poisson ratio.

In addition, the multilayer liner 20 of the FFDD 10 is made of film layers that have a strength to be functional in contacting fluid and pressures of processing fluid as measured by ASTM D1708-13 method. The strength, i.e., strain at break $\varepsilon_{break}$, of the liner 20 is from 0.11 to 4 in one embodiment, from 0.18 to 8 in another embodiment, and from 0.1 to 10 in still another embodiment.

With reference to FIGS. 1-9 again, various designs for the rigid frame member 30 which holds in place the liner 20 are possible including, for example, in one embodiment the liner 20 can be kept in place in the frame 30 by a "hanging action" by hanging the liner 20 via cut out windows or film loops 27C, 27D, 28C and 28D, which are incorporated in the film flaps or extensions 27A, 28A, 27B and 28B, respectively on a hanging means, e.g., hooks 34A and 35A on one side of the top frame section 31 and by a hanging means, e.g., hooks 34B and 35B on the other side of the top section 31 of the frame 30 in combination with two rod members 29 on the side arms 32 and 33 of the frame 30. In another embodiment, a plastic male guides (not shown) can be inserted, before the heat-sealing process, into the side arms 32 and 33 of the frame 30 which can accommodate the liner 20 by inserting the liner through the guides to securely hold the liner in place. In still another embodiment, the rigid frame can be inserted into the two film hanging loops 27 before and then the loop film 27 can be heat sealed together with the flexible film liner 20. In yet another embodiment, the rigid frame can be made of two halves (not shown). The edges of the film liner can be inserted between the two frame halves and then the two parts are clipped together gripping the film liner in-between the two halves. In even still another embodiment, the rigid frame presents side clips that hold the flexible liner in place all around the frame. And, in yet another embodiment, the rigid frame presents two side doors/panels (not shown) that are open during the insertion of the flexible liner and closed during production. The door can be transparent to have view on the flow of formulation in the ducts. The two doors may have a layer of flexible foam on the surface in contact with the liner in order to keep the liner in place.

Figure 8:
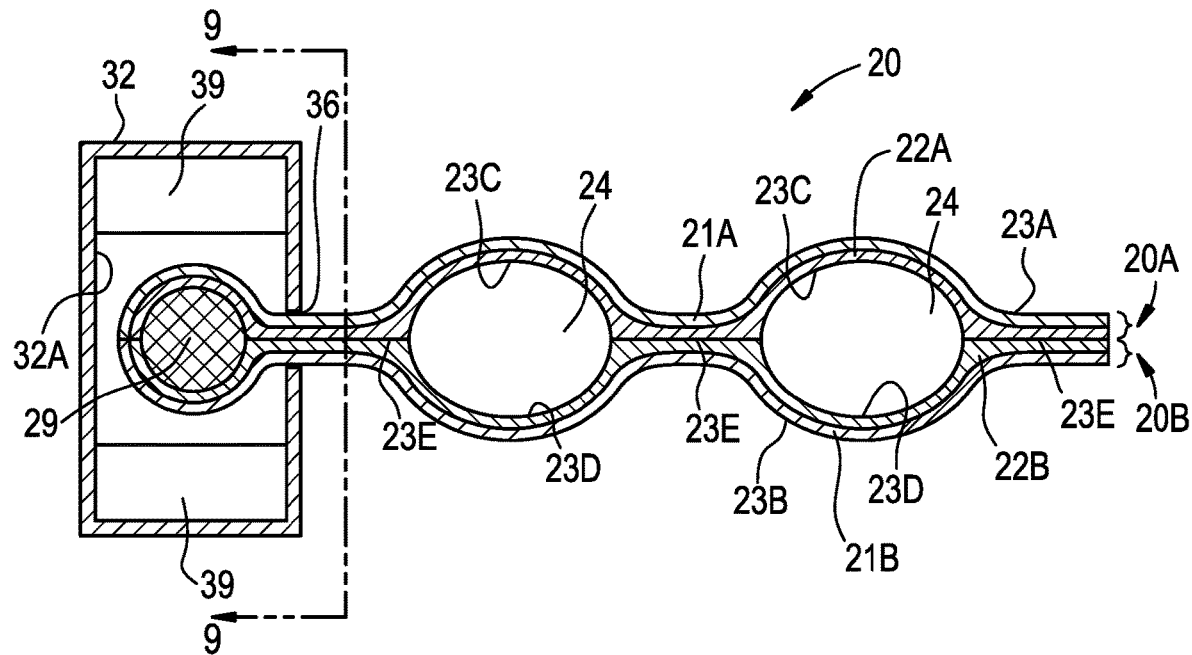
FIG. 8 is an enlarged cross-sectional view of a portion of the FFDD of FIG. 4 showing the ducts in the liner of the FFDD being inflated with liquid fluid flowing inside the ducts during usage of the FFDD.
Figure 9:
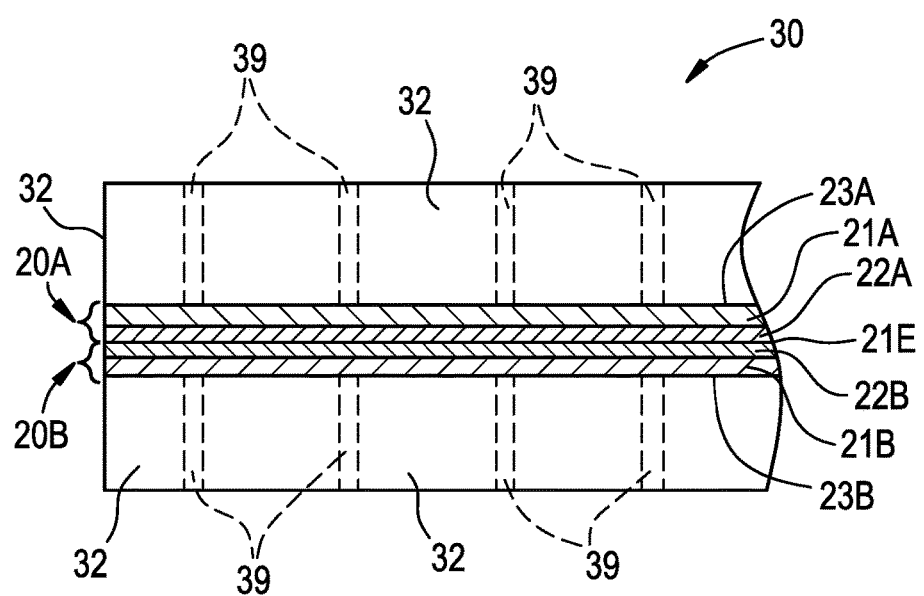
FIG. 9 is a partial cross-sectional view of a portion of the FFDD of FIG. 8 taken along line 9-9.
Figure 10:
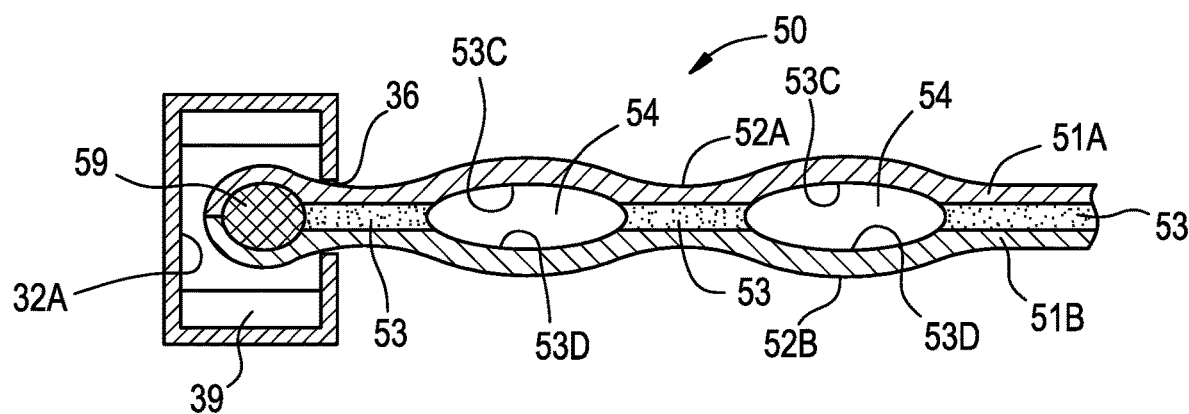
FIG. 10 is an enlarged cross-sectional view of a portion of another embodiment of the FFDD of the present invention.
Figure 11:
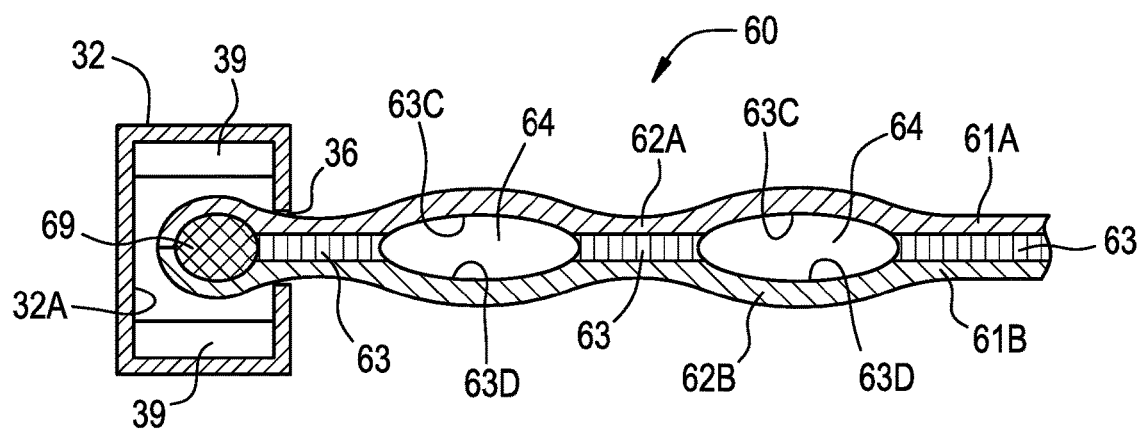
FIG. 11 is an enlarged cross-sectional view of a portion of still another embodiment of the FFDD of the present invention.
Figure 12:
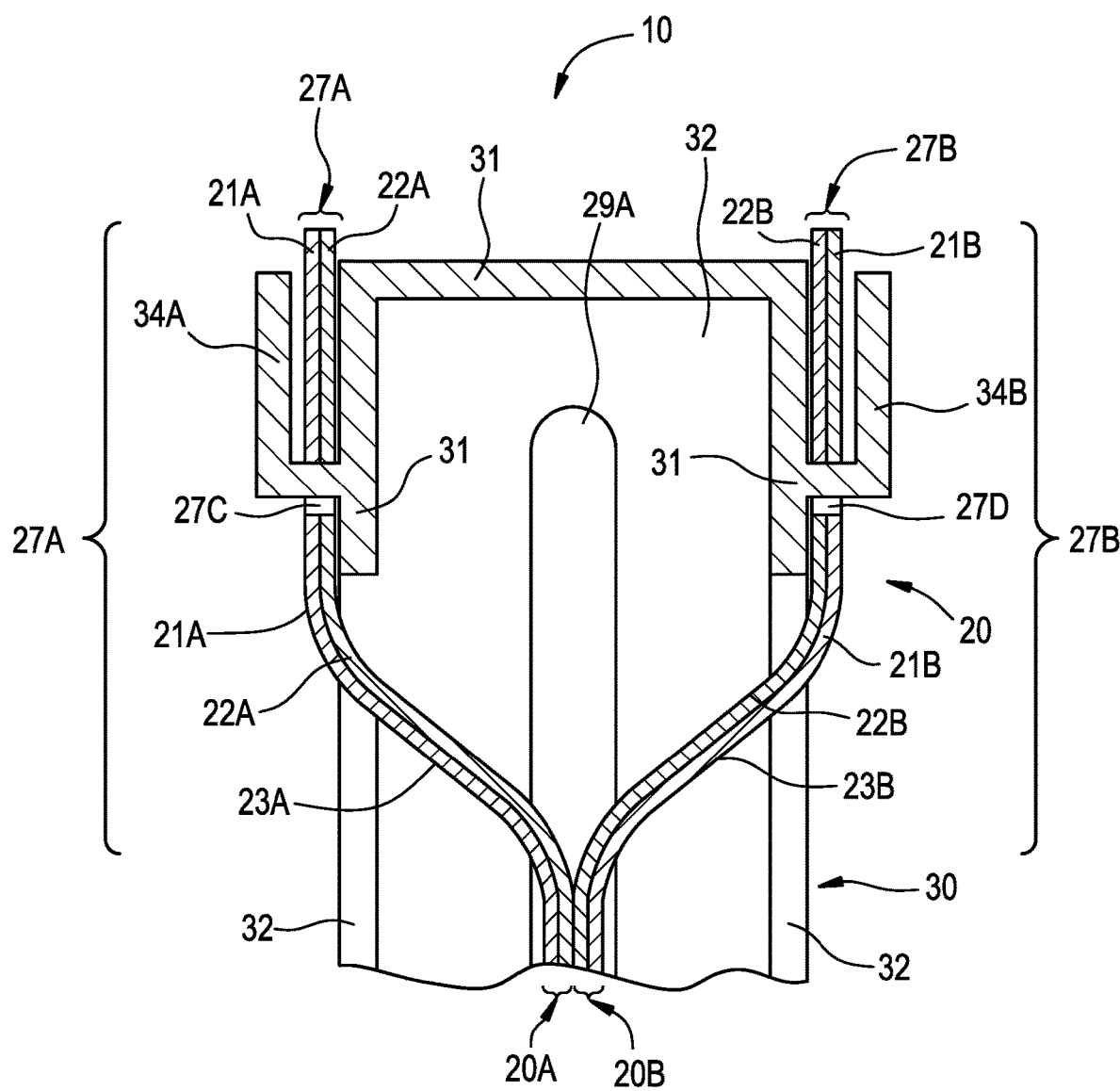
FIG. 12 is a partial cross-sectional view of a portion of the FFDD of FIG. 4 taken along line 12-12.

The frame width w (as shown by dimensional arrow W in FIG. 1) of frame 30 needs to be such that during usage the flow ducts 24 are able to inflate but also the liner is tensioned and held in place. Therefore, the width w of the rigid frame needs to satisfy the following Equation (II):

$$w = \frac{N\pi d}{2} + (N+1)l \qquad \text{Equation (II)}$$

where N is the number of the outlet ducts of the flexible film liner, d is the diameter of the flow ducts, and l is the distance between the outlets 26 of the flow ducts. FIG. 7 shows the ducts of the liner before flowing fluid through the ducts 24. FIG. 8 shows the inflated ducts 24 during usage of the dispenser when fluid is flowing through the ducts.

The rigid frame 30 of the FFDD 10 can be made of various materials, including for example, metal, wood, polymer composites, plastic, and the like, and combinations thereof.

Figure 4:
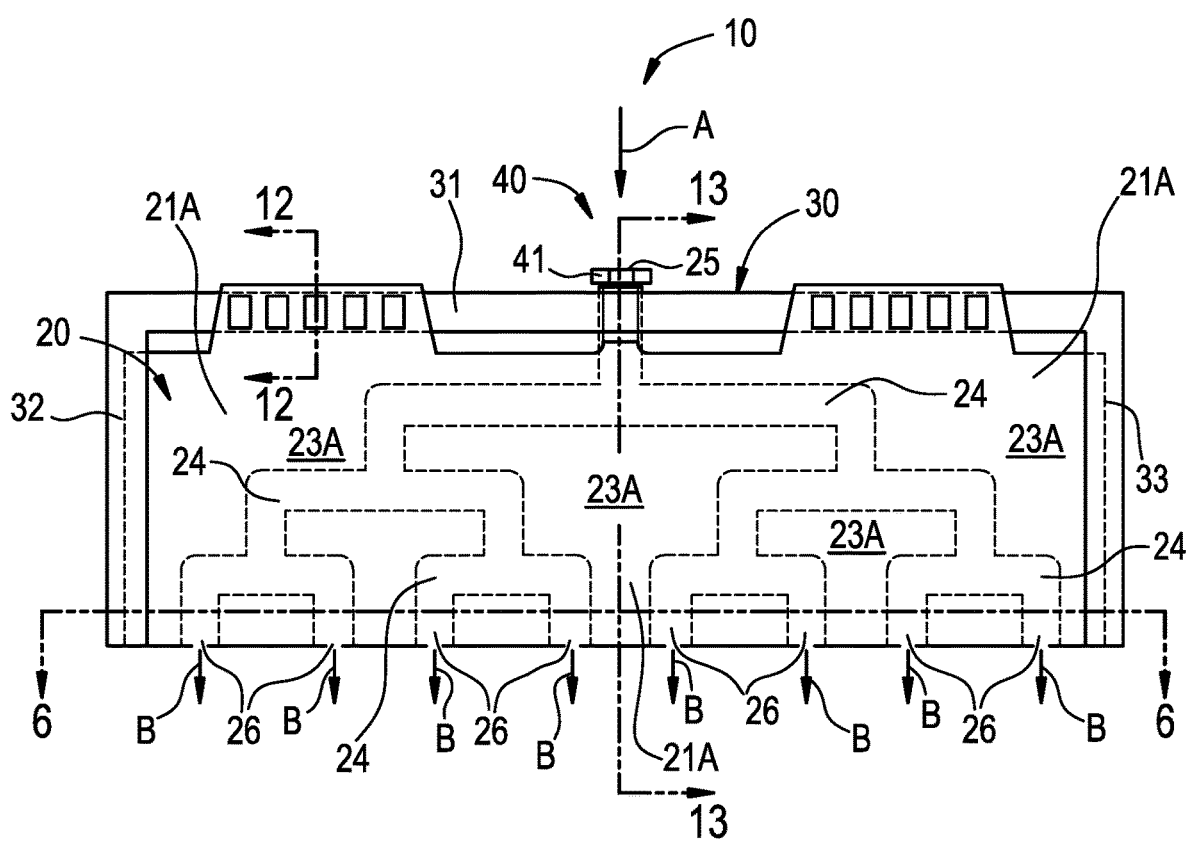
FIG. 4 is a front view of a FFDD showing a flexible film fluid-dispensing liner member fastened to a frame member for holding the liner member in place, during and after the flow of liquid fluid through the ducts of the liner.
Figure 5:
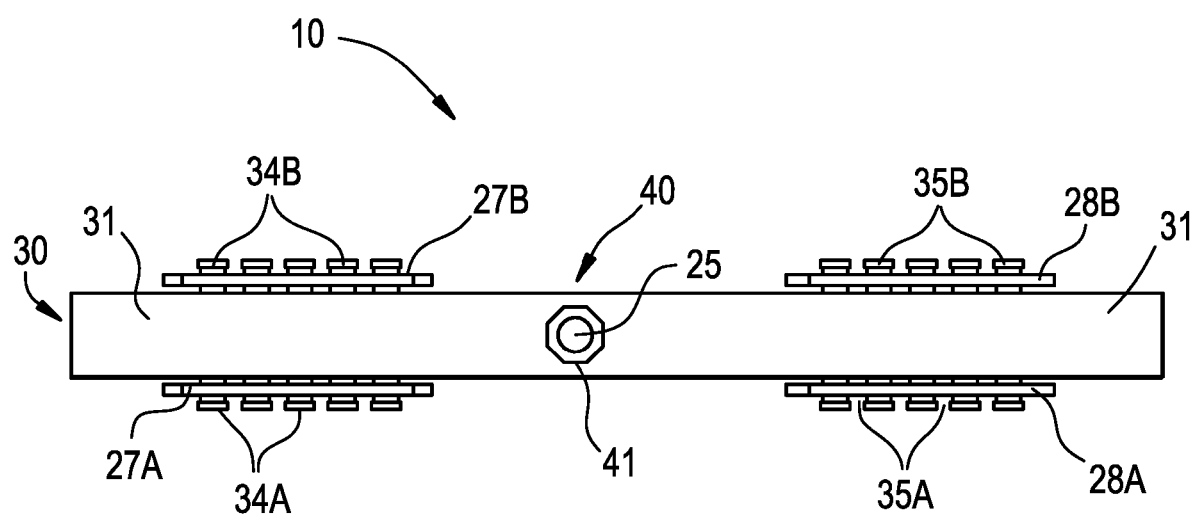
FIG. 5 is a top view of the FFDD of FIG. 4.

The connection means or connector 40 (preferably a hermetic connector) of the FFDD 10 is used to provide a connection between (1) the inlet 25 (see FIGS. 4 and 5) of the FFDD 10 for introducing fluid to the FFDD 10, for example, in the direction of flow indicated by directional arrow A as shown in FIG. 4; and (2) the output pipe/pipes of a fluid production line or process such as a RFDBL. The connector 40 is essentially made of at least two parts. A first part of the connector 40 includes a fitment 41 and a top securing annular member 42 and a bottom securing annular member 43; the fitment 41 and securing annular members 42 and 43 are used to rigidly fix the liner 20 to the upper part 31 of frame 30; and to create a funnel to feed a fluid to the FFDD 10. And, a second part of the connector 40 includes a threadable nut 44 rotatably mounted to the flange 41A of the fitment 41 to connect the first part of the connector 40, that has been previously fixed to the frame 30, to a fluid pipe member such as outlet pipe member 88 of a fluid feed and production line 80 (shown in FIG. 13). The nut 44 is used to connect the FFDD to the outlet pipe 88.

In one embodiment, shown in FIGS. 13 and 14, the connection means 40 includes the fitment member 41 comprising, for example, a fitment flange section 41A, a fitment top tubular section 41B, an annular ridge section 41C, and bottom tubular section 41D all integral with each other forming the fitment 41. The bottom tubular section 41D of the fitment 41 is heat sealed to the substrates 20A and 20B of the liner 20 using a heat-sealing process. The fitment 41 can be held in place to the top section 31 of the frame 30 using the securing annular members 42 and 43.

The top securing annular member 42 comprises, for example, a top flange section 42A integral with a bottom tubular section 42B; the top flange section 42A being disposed above the surface of the top section 31 of the frame 30 and the tubular section 42B being inserted through the orifice 35 of top section 31 of the frame 30. The tubular section 42B has male threads 42C.

The bottom securing annular member 43 comprises, for example, a ring member being disposed below the surface of the top section 31 of the frame 30. The securing annular member 43 includes female threads 43A for receiving the male treads 42C of section 42B of the top securing annular member 42. The threaded members 42 and 43 are treadably removable from each other. Once threaded securely, the top securing annular member 42 and bottom securing annular member 43 hold the liner 20 in place on the top section 31 of the frame member 30.

In a preferred embodiment, shown in FIGS. 13 and 14, the connection 40 is a hermetically sealed connection and further includes the nut member 44 having an internal circular ring groove 44A for receiving the flange section 41A of the fitment 41; the nut 44 being rotatably mounted on the flange section 41A of the fitment 41. The nut member 44 also includes an orifice 44B (shown in FIG. 14) with female threads 44C for receiving a fluid production pipe member 88 having male threads for removably attaching pipe member 88 to the female threads 44C of nut member 44. Then, the nut member 44 with the fitment 41 can be threadably connected (i.e., screwed) to the pipe member 88. In a preferred embodiment, the nut 44 can be threadably attached (i.e., screwed) to the pipe 88 without rotating the whole FFDD, facilitating the securing task for an operator.

With reference to FIGS. 13 and 15 again, there is shown a material feed section (or reaction mixture production section) generally indicated by numeral 80 which includes a source of liquid fluid mixture to be dispensed such as a fluid stored in storage tanks 81-83 which has been produced in a production process (not shown). The fluid from the storage tanks 81-83 flows via pipes 84-86, respectively, to a mixing means such as a mixing head 87 and exits the mixing head 87 through the output pipe 88 wherein the fluid to be dispensed is introduced into the FFDD 10. As aforementioned, the one end 41D of the liner's fitment member 41 is heat sealed to the liner 20 via substrates 20A and 20B using a heat-sealing process creating a funnel to the ducts 24 of the liner 20 of the FFDD 10; and the other end 41A of the liner's fitment member 41 provides a connection point for connecting the pipe 88 from the mixing head 87 to the FFDD 10. The nut 44, rotably attached to the one end 41A of the fitment member 41, can include female threads to receive the pipe member 88 (shown in FIGS. 13 and 14) having male threads for connecting the inlet end of the FFDD to a source of liquid fluid mixture to be dispensed.

In general, the process of fabricating the FFDD 10 of the present invention includes the steps of: (A) providing two flexible film substrates; (B) subjecting the substrates to a heat-sealing process that produces the film liner 20 (see FIGS. 6 and 7) wherein the flow path for the fluid to be dispensed is defined by the negative impression of the sealing die; (C) providing a rigid frame for holding the flexible film linear in place; and (D) combining the film liner 20 and the rigid frame together to form the FFDD 10.

In a preferred embodiment, the FFDD 10 can be manufactured by a process including the steps of: (I) laminating an interior and exterior film layer together forming a film substrate; (II) positioning two identical film substrates and a fitment member (i.e., hermetic connector) within a heat-sealing die; (III) heat-sealing the flexible liner; (IV) producing a reusable rigid frame via an injection molding process; and (V) assembling the pieces together to make the FFDD. In one embodiment, the pieces (or elements) or components 20, 30 and 40 making up the FFDD 10 can be assembled directly at the fluid production site to allow an operator to use the FFDD easily and quickly.

Some advantageous properties and/or benefits exhibited by the FFDD made by the above process of the present invention include, for example: (1) ease of production allowing the creation of complex flow path geometry otherwise impossible; (2) providing flexibility in covering different flow rate and formulations; (3) specialization of the different layer's material aiming at different performance, i.e. external layer for structural strength and integrity while interior layer with low chemical affinity with PU/PIR liquid mixture; and (4) as a consequence of the material layer specialization fouling can be reduced leading to a prolongation of the working life of the FFDD.

Currently, the FFDD's lifetime is about 4 hr. This time period relates to the fact that the reacting flow mixture flowing through the FFDD will have zero velocities at the contact with the walls of the ducts of the liner 20 of the FFDD. This means that a thin layer of fluid is stagnant at the walls of the ducts, and thus, the fluid has the time to react and to create a film of reacted material at the walls of the ducts. The reaction at the walls of the ducts reduces the internal diameter section area of the duct available for the fluid to pass through the duct, until the ducts clog completely. This phenomenon cannot be completely removed, but using materials with low affinity to PUR/PIR liquid mixture can permit to maintain a thin film of reacted material at the walls of the ducts for a longer period of time, while the flexibility of the FFDD could permit to automatically release these reacted foam because of the higher pressure produced by the fluid, once the section area is reduced. This also permits to design the distributor geometry, without taking in account fouling problems, while currently for example velocities lower than 2.5 m/s are discouraged in order to reduce the risk of fouling (see patent US 2017/00285619 page 3 paragraph 0036), and this has a direct impact on the FFDD geometry.

In one embodiment, with reference to FIG. 15, there is shown a FFDD 10 used in a production line, generally indicated as reference numeral 70 in FIG. 15. In FIG. 15, there is shown a continuous production line 70, including a material feed section (or reaction mixture production section) generally indicated by numeral 80; a foam-forming section (or foam production section), generally indicated by numeral 90; and a cutting and cooling section (or panel production section), generally indicated by numeral 100. The production line 70 of FIG. 15 can be used for manufacturing a rigid faced foam sandwich panel article or member, generally indicated as reference numeral 120. The production line 70 useful in the present invention can be a continuous production line or a discontinuous production line. For example, the production line 70 can include a rigid faced double belt lamination (RFDBL) continuous production line.

Figure 16:
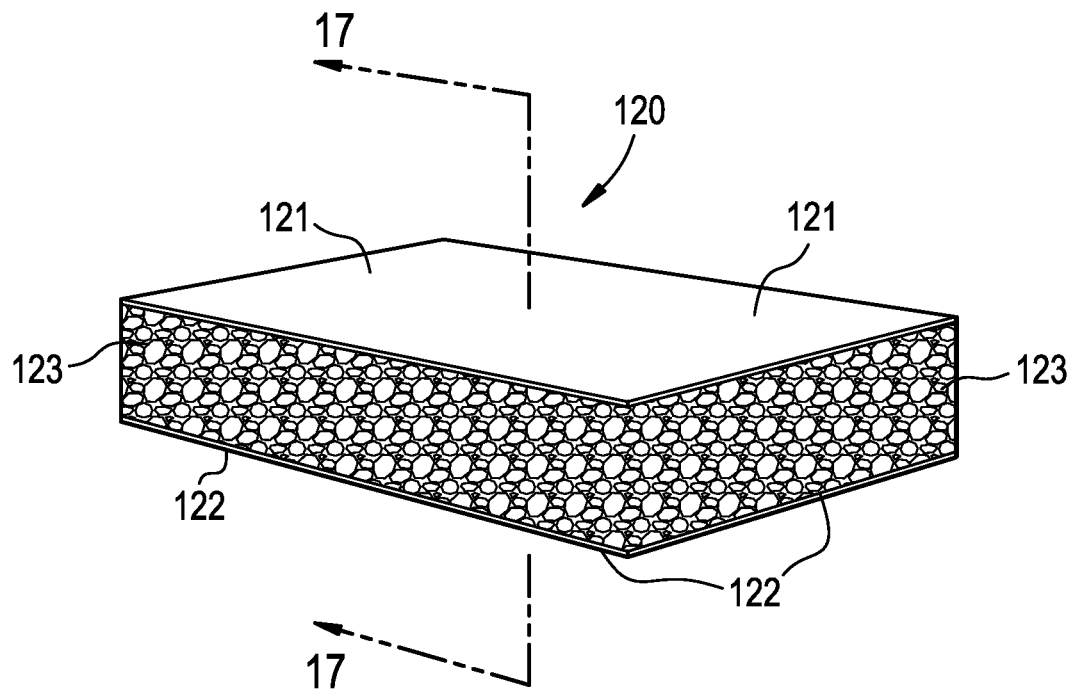
FIG. 16 is a prospective view of a rigid foam multilayer sandwich panel member prepared using the process and equipment of FIG. 15.
Figure 17:
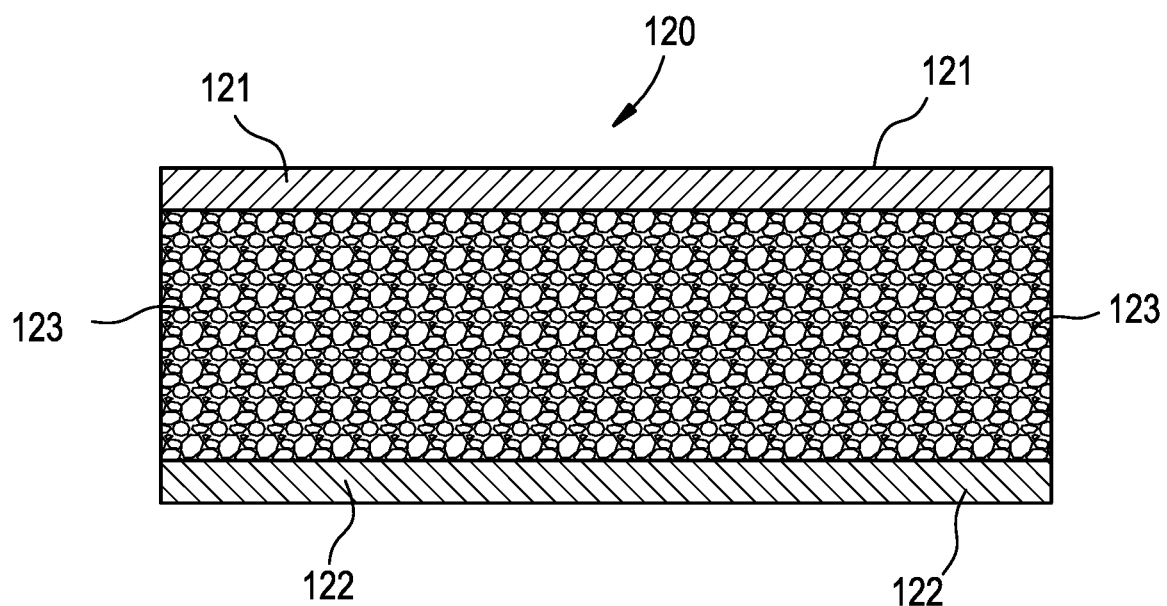
FIG. 17 is a cross-sectional view of the rigid foam sandwich panel member of FIG. 16 taken along line 17-17.

In one preferred embodiment, a multilayer foam sandwich panel member 120 can be produced using the production line 70 which includes the dispensing device 10 of the present invention. The panel member 120 includes, for example, a three-layer structure multilayer foam sandwich panel member 120 as shown in FIGS. 16 and 17, including a top sheet substrate (top layer) 121, a bottom sheet substrate (bottom layer) 122 and a middle foam layer 123 disposed inbetween the top and bottom layers and integrally attached to the top and bottom layers forming the three-layer panel article 120. While the production line 70 can include various pieces of equipment and steps known in the prior art for making panel articles, the production line 70 differs from the prior art by incorporating the novel flexible film fluid-dispensing device 10 of the present invention, which is connected to the foam-forming fluid production (the material feed section or reaction mixture production section) 80. The FFDD 10 dispenses a reactive fluid 91 onto the moving bottom facing layer 95 as shown in FIG. 15. The use of the FFDD 10 provides a panel member 120 with fewer defects and a more homogenous foam middle layer 123 of the panel 120 than using a conventional dispenser.

During operation of the FFDD 10 of present invention, the liquid fluid to be dispensed passes through the FFDD 10 and dispensed onto the surface of the moving bottom sheet substrate 95 of the production line 70. As fluid flowing through the internal space of the path ducts 24, the flexible fluid flow path ducts 24 inflate to a predetermined orifice diameter size when the ducts receive a fluid and the fluid passes therethrough (see FIG. 8). Advantageously, after the FFDD 10 is used and reaches its lifetime, at that point the liner 20 can be thrown away (disposed of) because the liner 20 can be economically manufactured using thin films of less than 2 mm thick and such liners can be readily discarded after use and are replaceable.

In another embodiment, a discontinuous production of panels can be carried out using molds or presses of defined shapes and sizes. A typical length of the mold is, for example, between 3 m and 12 m, the width of the mold can be in the range of from 1 m and 2 m, and the thickness of the mold can be between 5 cm to 20 cm. In this discontinuous process, the reacting mixture is usually injected in the mold and then the injection hole or holes are closed immediately after the injection. In some cases, the reacting mixture is poured and distributed with the mold opened through a casting rakes and then the mold is closed. Afterwards the foaming mass fills the molds, while air is released through venting holes specifically positioned according to the geometry of the molds. The continuous process is less flexible but has a much lower cost per square meter of panel. As described above, the continuous process includes, for example, a multi-component dosing unit, a high-pressure mixing head, a laydown section, where the reacting mixture is homogeneously distributed over the full width of the band, and a heated conveyor, permitting to transport and cure the foam, followed by the panel cutting section, where panels of desired length are cut. Panels are afterward left in the cooling section in order to finalize the curing before to be stacked and packed. In the case of a rigid-faced DBL at the beginning of the line there is also a profiling, pre-heating and pre-treating section (e.g. corona treatment and deposition of an adhesion promoting layer) of the metal sheet. Typical line speeds are from 4 m/min to 15 m/min for RF-DBL while FF-DBL can reach speeds of up to 60 m/min. Temperatures used for processing PUR and PIR foam are different and can vary. In general, for example, metal sheets temperature can vary between 20° C. and 80° C., while component temperature is in between 20° C. and 40° C. The mixing head is operated at pressure around 110 bar to 170 bar.

The FFDD of the present invention can be used to dispense or distribute various fluids and for various enduses. For example, the fluid to be dispensed can be PUR or PIR formulations, and any foamable (or foam-forming) liquid mixture.

In one preferred embodiment, the FFDD is advantageously used for dispensing a foam-forming reactive fluid mixture such as a polyurethane and/or a polyisocyanurate reacting mixture. In particular, the FFDD is useful for dispensing the foam-forming reactive fluid mixture in a process such as a double band lamination production process for producing foam sandwich panel articles.

Some of the advantageous properties exhibited by the panel member 120 made by using the above-described FFDD of the present invention can include, for example, the panel member 120 has: (1) a foam middle layer 123 that is homogeneous, and (2) a foam middle layer 123 that has a reduced density. For example, all the important properties of the foam middle layer 123, e.g. thermal conductivity, mechanical strength and density, can have a normalized standard deviation over the width of the panel from 0% to 15% in one embodiment, from 0% to 10% in another embodiment, and from 0% to 5% in still another embodiment.

In addition, having a more uniform distribution of the foam-forming reactive mixture by the FFDD also provides the manufacturer the capability of reducing the overpacking, and therefore, the final applied density of the panel, which in turn has a beneficial impact on the final cost of the panel. Foam overpacking is described as the amount of PUR/PIR foam exceeding the minimum amount of foam needed to fill the panel thickness. For example, the overpacking of the foam middle layer can be from 0% to 5% in one embodiment, from 5% to 8% in another embodiment, and from 5% to 15% In still another embodiment.

One of the major applications of PUR and PIR insulation foams is in commercial buildings using steel sandwich panels or flexible-faced sandwich panels. The sandwich panels of the present invention are advantageously used in applications that require one or more of the following properties: thermal insulation, mechanical strength, fire retardancy, and building efficiency. In some embodiments, the sandwich panels of the present invention are useful in both industrial and residential applications, and can be used, for example, as wall and roof panels, for cold stores insulation, for doors, for windows for sliding shutters, and the like.

OTHER EMBODIMENTS

In one embodiment, the rigid frame member, component (B), of the flexible fluid-dispensing device of the present invention is an upside down U-channel shaped rigid frame member for receiving at least the top edge and side edges of the flexible multilayer film member and for holding the flexible multilayer film member in place during the flow of fluid through the flexible multilayer film member.

In another embodiment, the connection means, component (C), of the flexible film fluid-dispensing device of the present invention is a hermitic connection.

In still another embodiment, the frame member of the flexible film fluid-dispensing device of the present invention is an upside down U-channel shaped rigid frame member comprises two side elongated flat plate panel portions integral with a bottom elongated flat plate panel portion; wherein one side elongated flat plate panel portion is integral with one end of the bottom elongated flat plate panel portion and protrudes perpendicularly from the bottom elongated flat plate panel portion; and wherein the other side elongated flat plate panel portion is integral with the other end of the bottom elongated flat plate panel portion and protrudes perpendicularly from the bottom elongated flat plate panel portion forming the upside down U-channel shaped rigid frame member when viewed in a perspective front view.

In yet another embodiment, the present invention includes a flexible film fluid-dispensing device, wherein the top edge of the flexible film liner member includes hanging means for fastening the flexible film liner member to the top elongated flat plate panel portions of the upside down U-shaped member; and wherein the side arm portions of the U-shaped member includes a fastening means for fastening the side edges of the flexible film liner member to the side elongated flat plate panel portions of the rigid frame member.

In even still another embodiment, the fastening means of the flexible fluid-dispensing device is a clamping means. The clamping means can comprise a hinged elongated flat plate panel portion on each of the side elongated flat plate panel portions of the rigid frame member for opening the hinged flat plate panel portion and closing the hinged flat plate panel portion and clamping the side edges of the flexible film liner member.

In even yet another embodiment, the flexible film fluid-dispensing device of the present invention includes a series (or pattern) of flexible fluid flow path ducts of the multilayer flexible film fluid-dispensing liner member which inflate upon flowing a fluid through the dispensing device, from the fluid inlet aperture of the dispensing device to the plurality of fluid outlet apertures of the dispensing device, wherein the series (or pattern) of flexible fluid flow path ducts of the multilayer flexible film fluid-dispensing liner member provides an even distribution of fluid exiting the plurality of fluid outlet apertures of the multilayer flexible film liner member onto the surface width of a moving belt substrate; and wherein the series (or pattern) of flexible fluid flow path ducts of the multilayer flexible film fluid-dispensing liner member deflate upon terminating the flow of fluid through the flexible film fluid-dispensing device.

Another embodiment of the present invention includes a flexible film fluid-dispensing device, wherein the flexible fluid flow path ducts of the multilayer flexible film fluid-dispensing liner member inflate to a predetermined orifice diameter size when the ducts receive a fluid and the fluid passes therethrough; and wherein the flexible fluid flow path ducts of the flexible film fluid-dispensing liner member deflate when fluid passes through the ducts, the fluid exits the plurality of fluid outlet apertures, and no further fluid passes through the ducts.

Still another embodiment of the present invention includes a flexible film fluid-dispensing device, wherein the first film substrate inner layer is bonded to the second film substrate inner layer by heat-sealing the substrates using a heating sealing die wherein, upon bonding the first film substrate inner layer to the second film substrate inner layer together the heat sealing forms (i) at least one fluid inlet aperture, (ii) a plurality of fluid outlet apertures, and (iii) a series (or pattern) of flexible fluid flow path ducts (or passageways) are formed in the flexible film fluid-dispensing liner member for passing a fluid therethrough.

Yet another embodiment of the present invention includes flexible film fluid-dispensing device, wherein the first film substrate inner layer is bonded to the second film substrate inner layer by heat-sealing the substrates using a heating sealing die; wherein some portions of the first and second film substrates are heat sealed together and some portions of the first and second film substrates are not heat sealed together such that flexible fluid flow path ducts for passing fluid therethrough are formed by the negative impression of the heat sealing die.

Even still another embodiment of the present invention includes a flexible film fluid-dispensing device, wherein the flexible film fluid-dispensing liner member includes further (c) at least one discontinuous middle layer having portions of the middle layer's body mass missing and portions of the middle layer's body mass not missing; wherein the discontinuous middle layer is disposed and bonded(sandwiched) inbetween the first and second substrate to form the flexible film fluid-dispensing liner member; wherein the discontinuous middle layer is characterized as having a pattern of missing body mass such that when the discontinuous middle layer is bonded inbetween the first and second outer layers, the non-missing body mass of the discontinuous middle layer adheres to the first and second film substrates and the missing body mass does not adhere to the first and second film substrates; and wherein upon bonding the first film substrate, the second film substrate, and the discontinuous middle layer together: (i) at least one fluid inlet aperatured, (ii) a plurality of fluid outlet apertures, and (iii) a series (or pattern) of flexible fluid flow path ducts are formed in the flexible film fluid-dispensing liner member for passing fluid therethrough such that the fluid exits the flexible film fluid-dispensing liner member. Even yet another embodiment of the present invention includes a flexible film fluid-dispensing device, wherein the at least one discontinuous middle layer of the flexible film fluid-dispensing liner member is a tie layer.

The flexible film fluid-dispensing device of the present invention includes a tie layer bonded to the first and second substrate outer layers by a heat-sealing process in another embodiment.

The flexible film fluid-dispensing device of the present invention includes at least one discontinuous middle layer of the flexible film fluid-dispensing liner member, wherein the middle layer is an adhesive layer in still another embodiment.

The flexible film fluid-dispensing device of the present invention includes at least one discontinuous middle layer of the flexible film fluid-dispensing liner member, wherein the middle layer is a combination of a tie substrate layer and an adhesive layer in yet another embodiment.

The flexible film fluid-dispensing device of the present invention includes a tie substrate layer, wherein the tie layer is bonded to the first and second substrate outer layers by adhering the tie substrate layer to the first and second substrate outer layers with an adhesive in even still another embodiment.

The flexible film fluid-dispensing device of the present invention includes a flexible film fluid-dispensing liner member that is operable at a temperature of from 10° C. to 50° C.; and at a pressure of from 0.1 bar to 12 bar in even yet another embodiment.

One embodiment of the flexible film fluid-dispensing device of the present invention relates to a flexible film fluid-dispensing device, wherein each film layer of the first and second substrate is separately selected from the group consisting of a metal, a plastic, a glass fiber-containing material, a mineral fiber-containing material, a cellulose-containing material or combinations thereof.

Another embodiment of the flexible film fluid-dispensing device of the present invention relates to a flexible film fluid-dispensing device, wherein each film layer of the first and second substrate is separately a polymer material selected from the group consisting of polyethylene, linear low density polyethylene, polyethylene terephthalate, oriented polyethylene terephthalate, metalized polyethylene terephthalate, polypropylene, oriented polypropylene, biaxially oriented polypropylene, oriented polyamide/Nylon, a silicone, and a coextruded film structure including one or more the aforementioned film substrate layers.

Still another embodiment of the present invention relates to a process for dispensing a fluid, wherein the process is continuous or discontinuous process.

Yet another embodiment of the process of the present invention includes the step of a fluid being dispensed on a moving substrate of a double band lamination production process to provide an even distribution of fluid being dispensed from the flexible fluid-dispensing device on the surface of the moving substrate.

Even still another embodiment of the process of the present invention includes the step of a fluid being dispensed on the surface of a stationary substrate to provide an even distribution of fluid being dispensed from the dispensing device on the surface of the stationary substrate. In this embodiment, the dispenser has to be able to inject the foam into the mold and then exit when the mold is closed allowing the PUR/PIR foam to cure. It can be done in two ways: (1) with the mold closed with the exception of one side where the dispenser could be taken out by using a casting rake, then the mold is closed; or (2) with an open lid mold, at the end of the PUR/PIR injection, the dispenser is taken out and the lid of the mold closed.

In the above process, in another embodiment, the stationary substrate is disposed in the inside of a mold. In the case of a discontinuous process for which a mold is used, after the step (III) of the present invention, the flexible film fluid-dispensing device is introduced inside the mold before starting the flow of fluid inside mold.

In the above process, in still another embodiment, the fluid is a polyurethane foam-forming reaction mixture composition.

In the above process, in yet another embodiment, the polyurethane foam forming reaction mixture composition includes an isocyanate component and an isocyanate-reactive component.

What is claimed is:

1. A flexible film fluid-dispensing device comprising:
   (A) at least one flexible film member having a flexibility property of from 3.6e-10 Nm to 2 Nm; wherein the flexible film member includes:
     (i) at least one fluid inlet aperture,
     (ii) a plurality of outlet apertures, and
     (iii) a series of flexible inflatable and deflateable fluid flow path ducts integral with the at least one fluid inlet aperture and the plurality of outlet apertures for passing a fluid through the fluid flow ducts and out of the flexible film member;
   (B) a rigid frame member for receiving at least one edge of the flexible film member and for holding the flexible film member in place during the flow of fluid through the flexible multilayer film member; and
   (C) a connection means for connecting the flexible film member to the outlet feed stream of a fluid production line, wherein:
   the at least one flexible film member, component (A), includes a multilayer flexible film fluid-dispensing liner member; wherein the multilayer flexible film fluid-dispensing liner member includes:
     (a) at least one first flexible film substrate layer; and
     (b) at least one second flexible film substrate layer;
   the at least one first flexible film substrate layer is bonded to the at least one second flexible film substrate layer; wherein the first and second substrates of the multilayer flexible film fluid-dispensing liner member are constructed of a material adapted for use with and contacting a polyurethane composition fluid; and
   the multilayer flexible film fluid-dispensing liner member has a flexibility property of from 3.6e-10 Nm to 2 Nm as calculated by the following equation:

$$D = \frac{Et^3}{12(1-v^2)}.$$

where E is the equivalent substrate Young modulus, t is the substrates' thickness and v is the equivalent substrate Poisson ratio.

2. The flexible film fluid-dispensing device of claim 1, wherein the rigid frame member, component (B), is an upside down U-channel shaped rigid frame member.

3. The flexible film fluid-dispensing device of claim 1, wherein the connection means, component (C), is a hermitic connection.

4. The flexible film fluid-dispensing device of claim 1, wherein a first film substrate inner layer is bonded to a second film substrate inner layer by heat-sealing the substrates using a heating sealing die wherein, upon bonding the first film substrate inner layer to the second film substrate inner layer together the heat sealing forms (i) at least one fluid inlet aperture, (ii) a plurality of fluid outlet apertures, and (iii) a series (or pattern) of flexible fluid flow path ducts (or passageways) are formed in the flexible multilayer film member for passing a fluid therethrough.

5. The flexible film fluid-dispensing device of claim 1, wherein the series of flexible fluid flow path ducts of the flexible multilayer film member inflate upon flowing a fluid through the ducts of the flexible fluid-dispensing device; and wherein the series of flexible fluid flow path ducts of the flexible multilayer film member deflate upon terminating the flow of fluid through the dispensing device.

6. The flexible film fluid-dispensing device of claim 1, wherein the at least one discontinuous middle layer of the flexible multilayer film member is a tie layer, an adhesive layer, or a combination thereof.

7. The flexible film fluid-dispensing device of claim 1, wherein each film layer of the first and second substrate is separately selected from the group consisting of a metal, a plastic, a glass fiber-containing material, a mineral fiber-containing material, a cellulose-containing material or combinations thereof.

8. The flexible film fluid-dispensing device of claim 1, wherein each film layer of the first and second substrate is separately a polymer material selected from the group consisting of polyethylene, linear low density polyethylene, polyethylene terephthalate, oriented polyethylene terephthalate, metalized polyethylene terephthalate, polypropylene, oriented polypropylene, biaxially oriented polypropylene, oriented polyamide/Nylon, a silicone, and a coextruded film structure including one or more the aforementioned film substrate layers.

9. A process for dispensing a fluid comprising the steps of:
   (I) providing the flexible film fluid-dispensing device of claim 1;
   (II) connecting the fluid production line to the flexible fluid-dispensing device;
   (III) providing a fluid from a fluid production line;
   (IV) flowing the fluid from the fluid production line through the flexible dispensing device; and
   (V) dispensing the fluid from the flexible film fluid-dispensing device onto the surface of a substrate.

10. A flexible film fluid-dispensing device comprising:
    (A) at least one flexible film member having a flexibility property of from 3.6e-10 Nm to 2 Nm; wherein the flexible film member includes:
      (i) at least one fluid inlet aperture,
      (ii) a plurality of outlet apertures, and
      (iii) a series of flexible inflatable and deflateable fluid flow path ducts integral with the at least one fluid inlet aperture and the plurality of outlet apertures for passing a fluid through the fluid flow ducts and out of the flexible film member;

(B) a rigid frame member for receiving at least one edge of the flexible film member and for holding the flexible film member in place during the flow of fluid through the flexible multilayer film member; and (C) a connection means for connecting the flexible film member to the outlet feed stream of a fluid production line, wherein:

a first film substrate inner layer is bonded to a second film substrate inner layer by heat-sealing the substrates using a heating sealing die wherein, upon bonding the first film substrate inner layer to the second film substrate inner layer together the heat sealing forms (i) at least one fluid inlet aperture, (ii) a plurality of fluid outlet apertures, and (iii) a series (or pattern) of flexible fluid flow path ducts (or passageways) are formed in the flexible multilayer film member for passing a fluid therethrough.

11. A process for dispensing a fluid comprising the steps of:

(I) providing the flexible film fluid-dispensing device of claim 10;

(II) connecting the fluid production line to the flexible fluid-dispensing device;

(III) providing a fluid from a fluid production line;

(IV) flowing the fluid from the fluid production line through the flexible dispensing device; and (V) dispensing the fluid from the flexible film fluid-dispensing device onto the surface of a substrate.

\* \* \* \* \*